May 4, 1926.
R. R. HIND
ROTARY CUTTER
Filed March 31, 1925
1,583,150
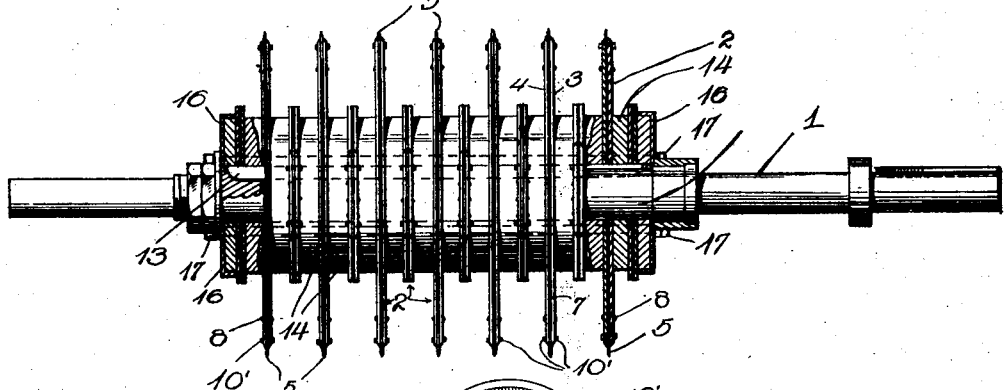
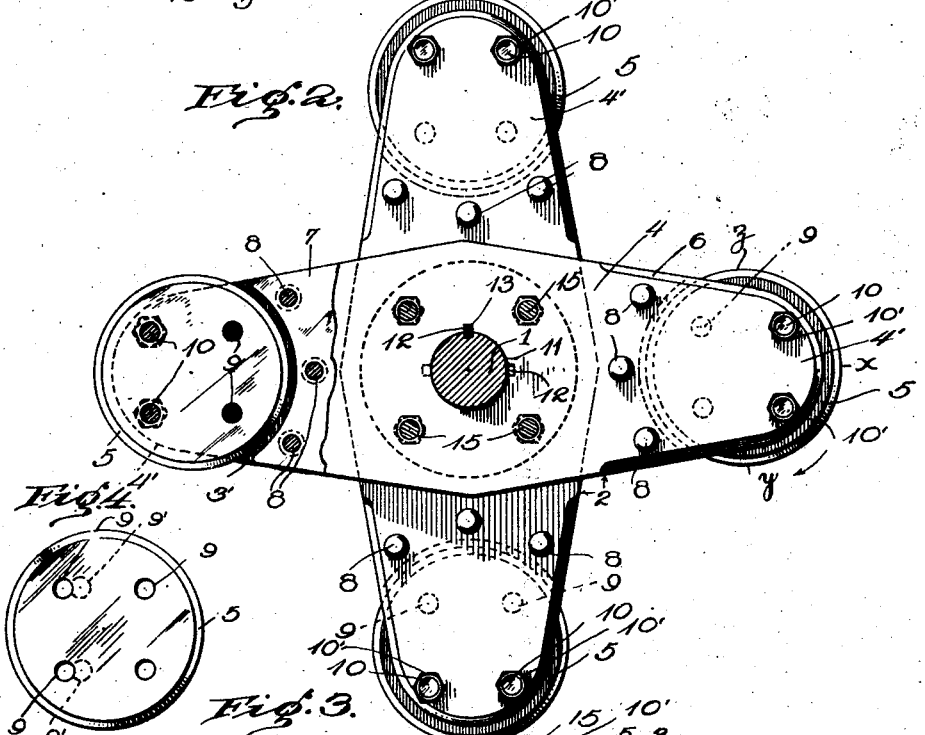
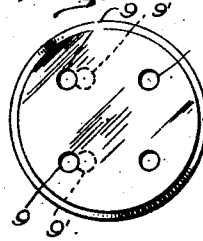
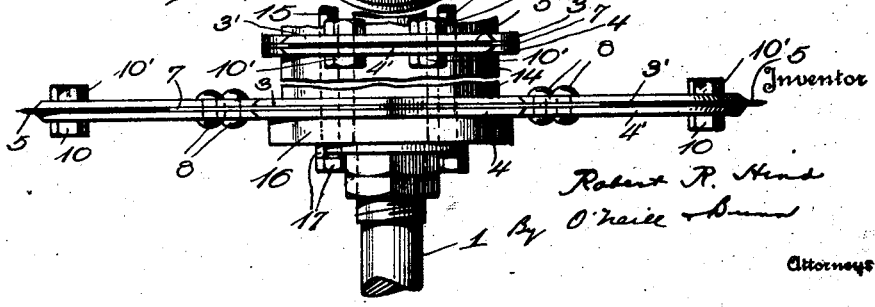

Patented May 4, 1926.

1,583,150

UNITED STATES PATENT OFFICE.

ROBERT R. HIND, OF DEL CARMEN, PHILIPPINE ISLANDS.

ROTARY CUTTER.

Application filed March 31, 1925. Serial No. 19,682.

*To all whom it may concern:*

Be it known that I, ROBERT R. HIND, a citizen of the United States, residing at Del Carmen, Pampanga, Philippine Islands, have invented certain new and useful Improvements in Rotary Cutters; and I do hereby declare the following to be a full, clear, and exact description of the invention, such as will enable others skilled in the art to which it appertains to make and use the same.

This invention realtes to rotary cutter knives for comminuting cane, corn stalks and other vegetable matter, and has for its object to provide an apparatus of the kind described, in which the cutter knives are so constructed and arranged as to materially reduce the liability of fracture, even when operating at high speeds.

Another object of the invention is the provision of knife blades which may be easily adjusted so that, when a cutting portion of the blade becomes dulled, the blade may be moved to another position in which a sharper portion thereof may be utilized in the cutting operation.

Other objects of the invention will be made apparent in the following specification, when read in connection with the accompanying drawings forming a part thereof.

In said drawings:

Fig. 1 is a side elevation, partly in section, of a shaft equipped with a plurality of rotary knives.

Fig. 2 is an enlarged front elevation, partly broken away, of the cutter knives, showing the drive shaft in section.

Fig. 3 is a fragmentary top plan view of the knives as shown in Fig. 1, and

Fig. 4 is a detail plan view of one of the knife blades.

Now referring specifically to the drawings, in which like reference characters indicate corresponding elements throughout the several views, 1 indicates a rotary shaft, upon which a plurality of the cutter knives are mounted, in the manner described in my U. S. Patent No. 1,273,488, issued July 23, 1918.

As shown in Figs. 1 and 2, each of the cutters comprises a body portion or blade carrier 2, composed of two co-operating plates 3 and 4 of similar shape and arranged in parallelism, and adapted to receive between them at each end, a cutter disk 5, the edges of the plates being integrally provided with a reversely-turned, integral strengthening flange 6. A liner 7 is positioned between the plates 3 and 4, serving to retain the plates in spaced relation, and a plurality of rivets or bolts 8, 8, extend through the two plates and the liner 7, and securely bind the plates together, as clearly indicated in Figs. 2 and 3. At its outer edge the liner 7 is concaved, as shown at the left, Fig. 2, to permit of the reception of the disk cutter knife 5, within the seat formed between the outer rounded ends 3' and 4' of the plates 3 and 4.

As shown in Figs. 2 and 4, the cutter knives 5 are each provided with a plurality of apertures 9, 9 preferably arranged in pairs which are diametrically opposed, all of said apertures being equi-distant from the center of the knife 5, similar and registering apertures being also provided adjacent the outer ends of the plates 3 and 4. In securing the knives 5 in position they are placed between the outer ends 3' and 4', and bolts 10 are extended through the apertures in the plates and the apertures 9, 9, in the disks, and nuts 10', 10' are threaded onto the bolts and securely hold the knives in position, as will be readily understood.

The carriers 2 are centrally provided with a perforation 11 adapted to fit upon and closely embrace the shaft 1, each perforation being provided with a notch 12, adapted to receive a key 13 which is carried on the shaft 1, whereby to lock the carriers 2 against rotative movement with respect to the shaft 1.

As many of the carriers 2 as are desired are placed upon the shaft 1, each carrier being positioned thereon so as to extend in a plane at a definite angular relation with respect to the plane of the adjacent carrier, such relation being here shown as 90°, but which relation may be varied at will. Between each carrier is positioned a spacer 14, for the purpose of preserving the distance between the carriers.

The plates 3 and 4, the fillers 7, and the spacers 14, are all provided with a plurality of apertures spaced at equal distances from the periphery of the shaft 1, and through bolts 15 are extended through all of said apertures. Against the outer face of each of the end knives, there is preferably provided a removable washer or collar 16, which is similarly provided with an opening registering with the aligned openings in the knives, fillers and spacers, for the reception of the bolts 15. The ends of said bolts 15 are threaded, and lock nuts 17 are turned down on the ends of said bolts, whereby to firmly secure the assembled knives in position on the shaft 1.

In actual operation the carriers 2 are rapidly revolved and the cutters move in the direction of the arrow, Fig. 2. It will be understood that, during the passage of the cutter through the stock, the greater portion of the cutting operation is performed by the lower right-hand quarter-section of the cutter edge, or that section between the points $x$ and $y$, Fig. 2. Under such circumstances it is obvious that the section $x—y$ would eventually become somewhat dull, and lose its efficiency. When necessary therefore, the nuts 10' are turned off the bolts 10, and the latter are withdrawn. The cutter 5 is then rotated one-fourth of a complete turn and the bolts 10 extended through the apertures 9 which are then aligned with the apertures in the plates 3 and 4, and the nuts 10' replaced on the bolts 10. It will be understood that this new assembly has caused a new quarter-section $x—z$, of the cutter 5 to be brought into position for the cutting operation. Even though the section or arc $x—z$ had already been once presented to cutting position, during rotation of the knife 5, the continued passage of this section through the stock, constantly being cut by the section $x—y$, serves to sharpen the section $x—z$. In other words the knife 5 is self-sharpening, due to the dulled quarter-section $x—z$ being constantly presented to the abrasive action of the cane or stock, the keenness of the edge of the knife being dependent upon the particular character of the stock.

If, after four changes in position of the cutter knives 5, the entire edge thereof becomes too dull for efficient service, the knife is removed and ground to a new edge, and used as before. After repeated grindings however, and constant wear on the knife, the diameter may be so reduced that the cutting edge will not extend beyond the outer ends of the plates 3 and 4, when the bolts 10 are in the apertures 9, as heretofore explained. Under these circumstances I may then provide additional apertures 9' 9' through the knives 5 adjacent each of the apertures 9, as shown in dotted lines, Fig. 4, and insert the bolts 10 through such new apertures.

From the foregoing it will be obvious that I have provided a cutter knife which is adapted for maximum efficiency during operation, and which may be easily adjusted to present a sharp cutting edge to the stock at all times.

Modification of the structure herein described will be suggested to those skilled in the art, but my invention covers all embodiments falling fairly within the scope of the appended claims.

What I claim is:

1. A rotary cutter comprising a plurality of spaced arms, a rotative shaft extending centrally through said arms, a disk cutter mounted at each end of each arm, and means for detachably securing each cutter to its associated arm, said means comprising apertures extending through each disk cutter and spaced from the center and edge thereof, and a plurality of bolts, each of which extends through said arm and an aperture in said cutter.

2. A cutter knife adapted for operative connection to a rotative shaft, comprising an arm consisting of two plates arranged in parallelism and providing a socket at each end, a disk cutter mounted in each socket, said cutter being provided with a plurality of apertures spaced from the center and edge thereof, and retaining bolts, each of which extends through the walls defining said socket and through one of said apertures.

3. A cutter knife adapted for operative connection to a rotative shaft, comprising an arm consisting of two plates arranged in parallelism and providing a socket at each end, a disk-cutter positioned in each socket, and means for securing each cutter in position in its socket, said means comprising spaced apertures between the center and edge of said cutter, aligned apertures in the opposed plates forming the socket, and removable fastening members extending through the apertures in the cutter and in the plates.

4. A cutter arm adapted for attachment to a rotative shaft comprising two parallel plates having walls forming a disk cutter socket at each end, a disk cutter located in each socket, apertures extending through the cutter between the center and cutting edge thereof, apertures through the walls of said sockets, and detachable bolts extending through any two of said apertures in the cutter and through the apertures in said walls substantially as described.

5. A cutter disk provided with a cutting edge and with a plurality of apertures extending through the body of said disk, said apertures being arranged in pairs, the apertures of each pair being positioned at equal distances from the center of the disk and spaced from the said cutting edge.

6. A cutter disk provided with a cutting edge and a plurality of apertures extending through the disk and arranged in alignment on each side of the axial center thereof, substantially as described.

In testimony whereof I affix my signature.

ROBERT R. HIND.